H. Wayne,

Mirror,

N° 11,816. Patented Oct. 17, 1854.

Witnesses: Inventor:

UNITED STATES PATENT OFFICE.

HENRY WAYNE, OF CINCINNATI, OHIO.

JOINT FOR TOILET-GLASSES.

Specification of Letters Patent No. 11,816, dated October 17, 1854.

*To all whom it may concern:*

Be it known that I, HENRY WAYNE, of Cincinnati, in the county of Hamilton and State of Ohio, have invented a new and useful Joint for Toilet-Glasses; and I do hereby declare the following to be a full, true, and exact description thereof, reference being had to the annexed drawings, making part of this specification.

Figure 1:
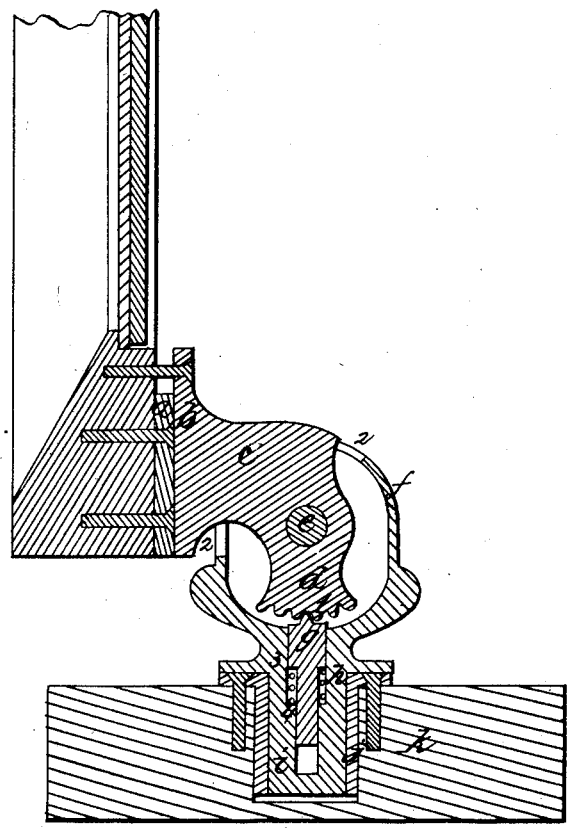
Figure 2:
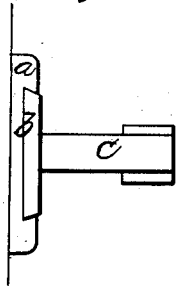

The object of my improvement is to provide a joint, which shall render the toilet glass presentable in any direction, within a reasonable range, both lateral and vertical, so as within the limits of an ordinary or convenient sized glass, to bring different parts of the person successively within the scope of vision, or to adapt it readily and steadily, to the requirements of persons of different heights. Also to present the glass in such a lateral position as to avail to the person using it the advantage of a local light. These objects I mainly effect by means of a notched or toothed segment wing and spring click, in connection with the devices for attachment adjustment &c. represented in the annexed vertical section. (Figure 1) and top view of the bracket (Fig. 2).

($a$) is a tapered socket screwed fast to the miror back and fitting a dovetailed ear (6) on the bracket ($b, c, d$). This bracket extends at its lower edge in the form of a segmental wing ($d$) having shallow and somewhat tapered notches or indentations (1) as represented. It is supported by pivot ($e$) within the cup ($f$), said cup being slotted (2) to permit the desired play of the bracket.

($g$) is a pawl which fits within the notches (1) being held to the desired pressure within said notches by a spiral spring ($h$) which bears at one end against a shoulder (3) on the pawl and at the other end against a shoulder (4) in the cylindrical shank ($i$) of the cup. This shank fits and rotates horizontally within a socket ($j$) let into and secured to the top ($k$) of the toilet table or bureau. The pressure of the pawl is so adjusted by means of the spring as that the glass shall be held securely to any position in which it is placed and prevented from shifting by the action of any force short of an intentional one against the mirror.

The tension of the spring may if desired be adjusted after its insertion, by means of a nut from below.

I claim as new and of my invention:

The vibrating bracket having a segmental wing, with tapered indentations and spring pawl,—or their equivalents—in combination with the horizontally rotating pivot as described, forming a shifting joint for a toilet glass.

In testimony whereof, I hereunto set my hand before two subscribing witnesses.

HEN. WAYNE.

Witnesses:
GEO. H. KNIGHT,
BEN J. HORTON.